Sept. 6, 1966     M. W. WINDSOR     3,270,639
LIGHT INTENSITY CONTROL SYSTEM
Original Filed March 28, 1960
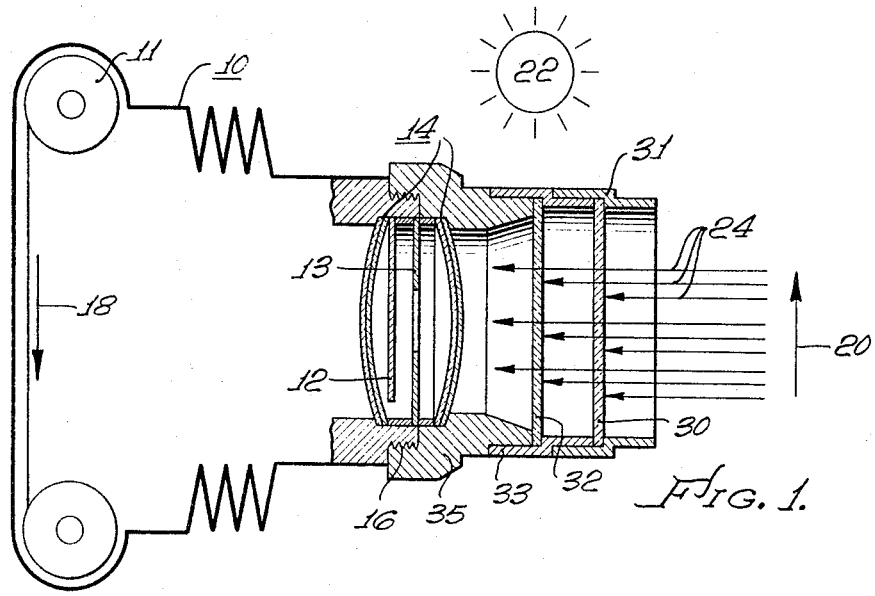
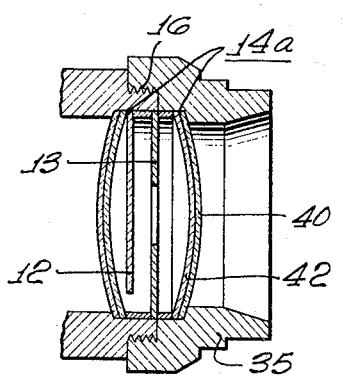
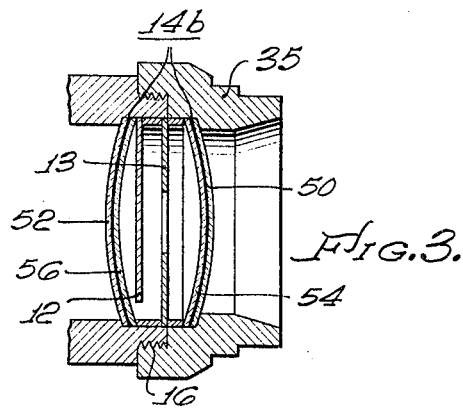
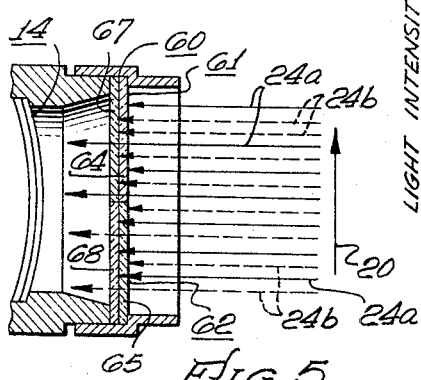
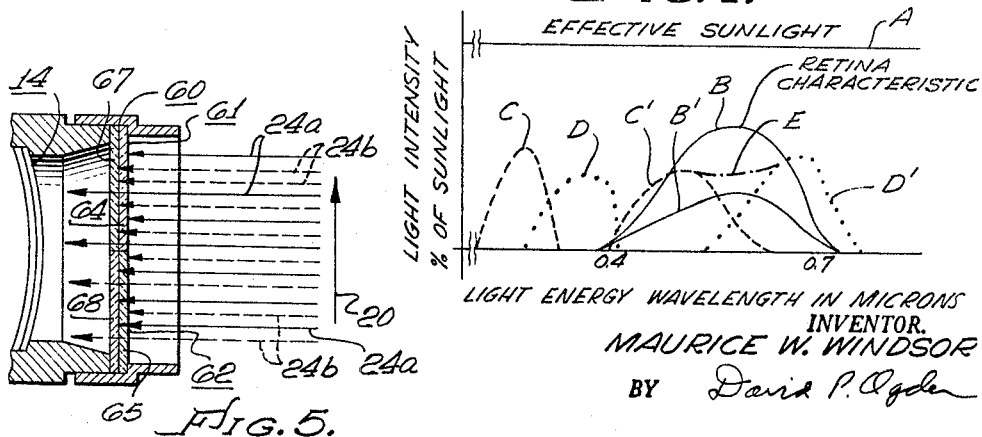
INVENTOR.
MAURICE W. WINDSOR
BY David P. Ogden
ATTORNEY.

United States Patent Office 3,270,639
Patented Sept. 6, 1966

3,270,639
LIGHT INTENSITY CONTROL SYSTEM
Maurice W. Windsor, Redondo Beach, Calif., assignor, by mesne assignments, to Thompson Ramo Wooldridge Inc., Cleveland, Ohio, a corporation of Ohio
Continuation of application Ser. No. 17,976, Mar. 28, 1960. This application Aug. 6, 1963, Ser. No. 301,935
4 Claims. (Cl. 95—10)

This invention relates to the art of automatically controlling the light intensity passing through an iris means and, in one arrangement is concerned with the automatic control of light energy impinging upon a photographic film contained within a camera system by means of a rapidly variable iris free of moving parts. This is a continuation of application serial No. 17,976, filed March 28, 1960, now abandoned.

In the currently popular camera systems a mechanically adjustable iris diaphragm is used to control the amount of light admitted through a camera lens to properly expose a photographic film. This approach to obtaining a desired exposure requires reliance upon the operator's guessing at the proper settings or the time consuming consultation of a light meter and exposure tables. In some circumstances, because of rapid environmental changes, guesses must be relied upon with frequent loss of quality in the finished picture.

Although recent attempts have been made to market cameras having an "electric eye" operative to regulate the iris mechanically, this approach to the problem is not entirely satisfactory. For instance, such a mechanical arrangement will not respond quickly enough to accommodate changes of intensity normal to indoor "flash pictures" with the result that further complicating mechanisms must be added selectively to override the "electric eye" control. Moreover, there are presently available many grades of film having many different exposure time and light intensity requirements, with a concurrent requirement for additional overriding control gadgets. Obviously such a system results in several moving parts and requires the supply of a certain amount of power, both of which are likely to foment maintenance problems. Furthermore, it is often desirable for a photographer to be able to control the depth of focus in a particular "shot." By controlling the relation between the iris setting and the shutter speed, one is able to select a desired depth of focus. However, with the automatic cameras, such depth of focus control, if desired, is more complex.

On the other hand, the professional photographer has use for some of the superfast photographic films which are so extremely light sensitive that they are ordinarily unsuitable for picture-taking in sunlight, even though they are quite effective for picture-taking in other low light level environments. Since ordinary cameras usually cannot be "stopped down" enough to accommodate the high light intensities presented by sunlit environments when the camera is loaded with the superfast film, these films are often considered impractical for a versatile photographic program.

In view of the above problems it is apparent that the use of a variable light transmissive filter to reduce the dynamic range of the light intensity presented to a film will increase the versatility of any film and camera system and will provide a camera system in which a super-sensitive film accommodates bright sunlight environments as well as the low light intensity environments for which it was originally intended.

Therefore, an object of my invention is to provide a reliable and rapidly responsive automatic iris means usable in various and rapidly changing light environments.

Another object is to provide a simple and reliable automatic light intensity control arrangement for a camera system.

A further object is to provide a simple and reliable camera system having rapid and automatically variable light intensity control iris means.

A further object is to provide an automatic and rapidly variable iris means free of moving parts.

In a general form of my invention when used in a camera system, the usual adjustable iris, either manual or automatic, is augmented or superseded by an automatically variable light intensity control filter arrangement. The filter arrangement is such that the light transmittance of a substance within the filter varies as a function of the light intensity, much as the human iris varies with the changes of light intensity. The substance exhibiting the reversible photochromic properties is dispersed throughout a light intensity control filter of the present invention.

According to one embodiment of my invention, a substance within the light intensity control filter is capable of radiative excitation to a metastable state whereby the opacity of the substance to photographic film exciting light wavelengths is a function of the concentration in the metastable triplet state of the substance: at one light intensity the filtering substance is substantially completely in a singlet state, while at higher light intensities an appreciable portion of the filtering substance is in the triplet (or higher) state. By selecting a substance wherein the singlet state is substantially transparent and the triplet state is partially absorptive of certain light wavelengths, a desired light intensity control filter is obtainable. In accordance with the present invention, the filtering substance may be located within the lens itself as a plane surface between curved surfaces of the lens, or dispersed throughout the lens, or may be located in the camera housing to intercept the light energy passing to the lens, or may be simply a filter attachment for presently available cameras.

In accordance with another embodiment of the present invention a substance having a metastable modification within the light intensity control filter is a compound which exhibits a tautomeric change brought about by the absorption of certain light wavelengths. As the tautomeric change occurs, the opacity of the substance changes. In this way the intensity of the light energy will control the opacity of the light intensity control substance.

The above light control filter behaviour can be explained in terms of the population density of a modified form of the molecule during application of high light intensities. This modified form of the molecule has a different absorption spectrum from the ordinary molecule, and if this absorption change occurs in the visible region of the spectrum, a color change may be observed. Depending upon the particular substance selected, the modified form referred to herein may be either a metastable triplet excited state of the molecule, a tautomeric modification or an otherwise modified form of the molecule.

The absorption spectrum of a molecule is dependent upon which light wavelength energy levels will excite the molecules. If a major percentage of the molecules are modified, the absorption frequencies may be changed. In a triplet state the absorptive characteristics of a molecule differ from those in a singlet state. A triplet state of a molecule is defined as a metastable excited state possessing two unpaired electrons. In certain substances, because of the triplet multiplicity of this state, normally rapid radiative return to the normal ground state of a molecule (which is usually a singlet state) is highly improbable because of the selection rule which formally "forbids" transitions between electronic states of differing multiplicities. In actual practice, however, because of small electromagnetic perturbations such as those produced by neighboring molecules, these transitions are rarely completely forbidden but take place with a very low probability. The triplet state is thus metastable; that is, it possesses a relatively long life compared to a corresponding singlet state. For example, lifetimes may lie between $10^{-3}$ and $10^3$ seconds instead of being of the order of $10^{-8}$ seconds as is normally the case for a fully allowed transition between singlet states in some of the common reversibly photosensitive molecules. However, transitions from the metastable triplet state to higher levels of the same multiplicity (that is, higher triplet states) are fully allowed transitions. Thus the metastable triplet state exhibits its own absorption spectrum which may be appreciably different from that of the ordinary unexcited singlet state molecule. When the absorption spectrum occurs in a filter substance within a region of the light spectrum visible to photographic film, a light intensity change may therefore be observed on such a film.

Another type of modifiable molecule is found in tautomeric states. A tautomeric state is a form of the molecule in which the configuration of the modified state differs from that of the normal state, usually by the position of one of the hydrogen atoms in the molecule. Tautomerism is definable as a kind of isomerism in which the isomers change into one another fairly readily so that they ordinarily co-exist in a predeterminable equilibrium. The relative ratios of this equilibrium may be displaced by changes of energy of the system as by a change in the light intensity passing through a tautomeric light intensity control substance. Again it should be kept in mind that certain of the tautomeric substances have a transmission characteristic dependent upon the equilibrium.

An otherwise modified form of a molecule may include photo-ionized forms of the molecule in which one or more electrons have been ejected during the absorption of light. An excited state of a molecule can be metastable by virtue of properties other than its electronic multiplicity, such as the overall symmetry of the molecular wave function or its parity. Such metastability will confer on the excited molecule a similarly long lifetime in the range of $10^{-3}$ to $10^3$ seconds.

In each of the above discussed phenomena it will usually occur that the activating light wavelength frequencies which excite the reversible phenomena will differ from the ones which are more predominantly absorbed after the phenomena has occurred. Because of this, the activating wavelengths must not be indiscriminately filtered prior to their passage to the light intensity control filter. The placing of the light intensity control filter in front of other optical members of a camera-film system will overcome such a problem.

The subject matter which is regarded as this invention is particularly pointed out and distinctly claimed in the concluding portion of this specification. The invention, however, as to its organization and operation, together with further objects and advantages there will best be understood by reference to the following description taken in connection with the accompanying drawing in which:

FIG. 1 is a sectional view of a conventional camera system arranged to use a filter system of the present invention;

FIG. 2 is a sectional view of one embodiment of a lens system containing filter material of the present invention;

FIG. 3 is a sectional view of a lens system embodying another arrangement of filter material;

FIG. 4 is a curve illustrating desired light wavelength characteristics of a filter and film system; and FIG. 5 is a sectional view of another filter system of the present invention.

Referring now to the drawing, wherein like numbers refer to similar parts, there is shown in FIG. 1 a conventional camera system 10 containing a supply of film 11, a shutter system 12, an iris system 13, and a lens system 14 suitable for selectively allowing an image 18 to impinge upon the film 11 when the camera system 10 is directed toward an object 20 and the shutter system 12 is activated. Often the shutter system 12 includes means (not specifically illustrated) for varying the shutter speed and usually the iris system 13 includes means (not shown) for varying the aperture thereof. In nearly all of the popular cameras available today the lens system 14 includes a mechanism such as a threaded connection 16 between supporting members of the lens system 14 for varying the focal length so that the image 18 may be a clear reproduction of the object 20.

In prior art camera systems, the iris system is usually variable in accordance with the magnitude of the light energy rays 24 from a light source 22 which are reflected by the object 20. In accordance with the present invention, an automatic light intensity control filter 30, supported within a holder 31 of the type well known in this art, is provided to intercept and selectively reduce the reflected light intensity reaching the film 11, and thus augment or supersede the function of the usual variable iris system. Since many of the particular metastable materials tested during the development of the present invention exhibit the property of reacting to changes in light intensity within milliseconds, such a light intensity control filter 30 is useable either outdoors or indoors even when the light intensity is varying rapidly or when the environment under surveillance is varied rapidly by the photographer.

Because of the fact that many metastable substances of the type usable in the light intensity control filter 30 exhibit the property of selectively transmitting various light wavelength frequencies combined with the fact that various photographic films, particularly the more popular color films, are selectively sensitive to some of these various light wavelength frequencies, it is desired to include in the filter system a second color balancing filter 32 which will intercept the light passing through the light intensity control filter 30 and filter the controlled radiation in a manner which will prevent undesirable color variations of the film 11 when it is developed. Thus the color balancing filter 32 is complementary to the light intensity control filter 30. As shown in FIG. 1, the color balancing filter 32 is supported in a second holder 33 which is supported by means of a friction fit on a lens housing 35 and which similarly supports the filter holder 31. It is recognized that the color balancing filter 32 may be of the type which continuously filters certain types of light wavelengths or, on the other hand, the color balancing filter 32 may be of a type containing a second matastable substance which selectively reduces the transmission of colors not filtered by the light intensity control filter 30. In such an arrangement, when color film is used the image will appear as a true color reproduction.

It is contemplated that the light control filter 30 and the color balancing filter 32 may be combined in a single filter holder to form a composite filter as by welding or bolting the two filter holders 31 and 33 together. Such a composite filter will effectively reduce light intensity in accordance with the effectiveness of the light on the film 11 and will provide true and desired tint and tone reproduction regardless of any light intensity reduction by the filter system 30 and 32. Moreover, by careful selection of the metastable substances used, it is contemplated that a single complex light intensity control filter may be used. Obviously the filter system may be permanently secured to the lens system 14 or the lens housing 35.

It should be realized that certain of the metastable substances or mixtures of substances which selectively reduce the transmission of light as a function of light intensity will not effect a great change in the color tint or tone of a particular color film. In such a case a filter as shown at 32 might be employed only to reduce haze or some other undesired characteristic of the environment of the object 20. Similarly, if the film is for black and white reproductions as used in newspaper work, etc., the selectivity of absorption of the metastable substance will not effect harmful tint or tone variations.

With the above thoughts in mind it becomes apparent that my invention of such dynamic light intensity control filtering arrangements is, in effect, an "automatically to ultra-violet radiation it absorbs visible light frequencies. It should be noted that care must be used in selection of these compounds because certain of the pyrylospirans do not react rapidly enough to provide a most desired versatility of camera utilization.

On the other hand, several other compounds (notably some of the substituted Dianthrones shown in the following table) have useful photochromic characteristics.

RATES OF DISAPPEARANCE OF COLOR AT 300° K. FOR TAUTOMERIC PHOTOCHROMIC COMPOUNDS

| Compound | First-order rate Constant, $k\sec.^{-1}$ | Decay Time $T=1/k$ sec. | Photochromic Color | Absorption Peak, $m\mu$ |
|---|---|---|---|---|
| 4,4′ Dimethyl Dianthrone | 112 | $8.9 \times 10^{-3}$ | Blue-Green | 630 |
| 4,4′ Dimethoxy Dianthrone | 148 | $6.8 \times 10^{-3}$ | Green | 690 |
| 4,4′ Dibromo Dianthrone | 631 | $1.6 \times 10^{-3}$ | do | 680 |
| 3,4:3′,4′ Dibenzo Dianthrone | 3,160 | $3 \times 10^{-4}$ | do | 700 |
| 2,2′ Dimethyl Dianthrone | 0.79 | 1.3 | do | 690 |
| 2,2′ Dibromo Dianthrone | 5.0 | 0.2 | do | 690 |
| 2,2′ Dimethoxy Dianthrone | 1.0 | 1.0 | do | 710 |
| 3,3′ Dibromo Dianthrone | 15.9 | $6.3 \times 10^{-2}$ | Blue-Green | 650 |
| Dixanthylene | 27,500 | $3.6 \times 10^{-5}$ | Purple | 600 |
| 1,1′ Dimethoxy Dixanthylene | 27,500 | $3.6 \times 10^{-5}$ | do | 610 |
| Xanthylidene Anthrone | 398 | $2.5 \times 10^{-3}$ | Green | 710 |
| 1,3,3 Trimethyl-indolins-2-spiro 6′ (2′, 3′)-B-naphthopyran. | 39.8 | $2.5 \times 10^{-2}$ | Red Violet | 565 |
| 2 (2′, 4′) Dinitrobenzyl Pyridine (Tschichibabin's compound). | 4.4 | 0.23 | Blue | 567 | variable iris means."

Referring now to FIG. 2, there is shown an enlarged view of a lens system 14a wherein the metastable substance of the light control filter 30 and the color balancing substance of the filter 32 are dispersed throughout the lens portions 40 and 42, respectively. Although care must be taken in a lens system of the type shown in FIG. 2 to provide an anastigmatic lens system, the dispersion of the metastable substance or other substances within the lenses of the system will not prevent the production of an accurate and desirable lens system. On the other hand, certain of the glass materials used for the manufacture of lenses will prevent transmission of activating ultra-violet wavelengths to some of the metastable substances usable in the present invention. If a metastable substance requiring ultra-violet radiation is used, the lens material may be selected from such materials as methylpolymethacrylate, cyclohexylpolymethacrylate, or polystyrene which are known to freely transmit a useful range of the ultra-violet radiation wavelengths.

Moreover, it is contemplated that the color and intensity control substances may be placed within the lens system without being dispersed throughout the lens material. In a lens system 14b shown in FIG. 3, the metastable substance of the light intensity control filter and color balancing filter layers, as indicated at 50 and 52, are placed between layers of lens glass prior to the grinding of the composite lenses 54 and 56 respectively. If the presently available lens curvature designs are to be utilized, it is most desirable that the layers 50 and 52 be "optically" thin. However, it is not requisite to the present invention that this be so, since the lenses 54 and 56 may be designed with slightly different curvatures to compensate for any variation of the characteristics thereof because of the insertion of the filter layers 50 and 52.

It should be noted that when using a tautomeric molecular substance such as certain of the pyrylospirans or the substituted Dianthrones, it will often be desirable to utilize the construction shown in FIG. 1 or 3 rather than that of FIG. 2 so that the vehicle for the tautomeric molecule may be a fluid or gel which will facilitate a change in the configuration of the atoms within a molecule. A specific example of a suitable tautomeric substance is one of the substituted 1,3,3 trimethylindolinobenzopyrylospirans which has the transmissivity of a colorless, transparent material in low light intensities while on exposure However, the tautomeric like substances 2, (2′, 4′) dinitrobenzylpyridine or 4, (2′, 4′) dinitrobenzylpyridine (also known as Tschichibabin's compounds) have a transmissivity which is colorless during exposure to low light intensity and which is dark blue during exposure to high light intensity. Also, in fluid solution or in a gel the transmissivity varies within a few milliseconds. The vehicle of support of these compounds may be a glass like material so long as it permits the movements of atoms necessary for tautomeric change.

Although it is recognized that the various filter systems discussed below are useable in lens systems illustrated in FIG. 2 or 3, only the construction of FIG. 1 will be referred to for ease of reading. A specific example of a triplet state metastable light intensity control substance is 1.2, 5.6 dibenzanthracene dissolved in a suitable transparent plastic vehicle. The result light intensity control filter 30 is positioned in light-intercepting relationship relative to the camera lens system 14 as shown in FIG. 1.

During receipt of relatively low light intensities, the light intensity control filter 30 is substantially transparent to visible light of the type which will cause energization of the film 11. As the light intensity reaching the light intensity control filter 30 is increased, increasing amounts of the 1.2, 5.6 dibenzanthracene are raised to the triplet state. As the population in the triplet state is increased, the substance takes on a reddish hue, indicative of an absorption of light in the blue-green portion of the light spectrum. With further increased light intensities the reddish hue becomes more pronounced, giving even greater absorption of the blue-green film energizing wavelengths.

In order to even further enhance the responsiveness of the automatic light control filter system using 1.2, 5.6 dibenzanthracene, one of the well-known ultra-violet and deep blue absorption constant color balancing filters 32 is desirably disposed in the region between the film 11 and the light intensity control filter 30 to selectively reduce these wavelengths to which film 11 is ordinarily sensitive. Alternatively, one of the above mentioned tautomeric substances may be used to provide a dynamic color balancing filter 30. Thus, in either case, the only wavelengths of light that reach the film through the light control and color balancing filters are wavelengths which are strongly affected by selected variable light intensity control substances. The necessity of the color balancing filter 32 is based on the presupposition that an ordinary blue sensitive film 11 is used, so that receipt of the light in the red wavelengths has an appreciably lesser effect on the particular film 11 being exposed than receipt of light in the wavelengths that are capable of being selectively blocked by the light intensity control filter 30. If one of the tautomeric substances is placed on the light intensity control filter 30, a color balancing filter 32 having a pink hue in the metastable state would be desirable. However, if the color balancing filter 32 is an automatically varying one, care must be taken to provide a system wherein the activating frequencies are not filtered by either the unexcited or the excited metastable states of the light intensity control filter 30.

While the invention is described in detail with respect to only a few metastable substances, it is appreciated that many other metastable substances can be used with the particular substance being selected for the light energy wavelengths in which variable response is desired. Thus the substance selection depends, at least to some extent, upon the particular film being used. For instance, chrysene transmits a reddish-violet color absorbing green-yellow light wavelengths; picene transmits a blue color absorbing yellow-red light wavelengths; and triphenylene transmits yellow and absorbs blue light wavelengths. The following table sets forth photochromic properties of several metastable triplet state compounds.

RATES OF DISAPPEARANCE OF COLOR FOR TRIPLET STATE PHOTOCHROMIC COMPOUNDS

| Compound | Decay Time, Secs. | Photochromic Color | Major Absorption Peak, m$\mu$ |
|---|---|---|---|
| Naphthalene | 2.6 | Pale Yellow | 415 |
| Anthracene | 0.1 | Yellow | 424 |
| Phenanthrene | 0.3 | Orange | 481 |
| Tetracene | 0.005 | Yellow | 460 |
| 1:2 Benzanthracene | 0.3 | Yellow-Orange | 485 |
| Triphenylene | 15.9 | Pale Yellow | 428 |
| Pyrene | 0.7 | Yellow-Orange | 416 |
| Coronene | 9.4 | Orange | 480 |
| Fuorene | 4.9 | do | 302 |
| Pilcene | ~1 sec. | Blue | 578 |

In the case of 1.2, 5.6 dibenzathracene the unexcited, ground, or singlet state molecule absorbs in the near ultra-violet and is thus effectively colorless within the above-described lens and filter system, whereas the triplet state absorbs in the blue-green, thus transmitting light of a reddish hue. On the other hand, the excited 2, (2′, 4″) dinitrobenzylpyridine absorbs in the yellow, thus transmitting light of a bluish hue. Several large classes of aromatic compounds show essentially similar metastable variable light transmissive behaviour to a greater or lesser extent. By proper material selection, the absorption of one isomer of a tautomeric substance or of a triplet state of a substance can be in a range from the near ultra-violet to the infra-red, and the lifetime of the metastable state which determines the build-up rate, the fading rate, and also the equilibrium concentration or population produced by a given light intensity can vary from a period of milliseconds or less to a period of ten seconds or more.

One of the many light intensity control filters can be prepared in the following manner: by mixing of .105 part of 1.2, 5.6 dibenzathracene and about 900 parts of boric acid; heating the mixture in a bath of mineral oil at a temperature of about 240° centigrade for approximately 15 minutes; and pouring the resultant clear liquid on a supporting vehicle such as a glass plate where, on cooling, it forms a thin solid filter membrane that is colorless and substantially transparent at low light intensities. When exposed to sunlight the filter membrane acquires a very definite reddish color. The coloration of one such sample is markedly increased by increasing the intensity of near ultra-violet light. The color fades in a few seconds on removing the intense light.

A neutral color light control filter system (useful in connection with some of the presently available color films) is made either by having a succession of component filters whose combined absorption covers the entire spectral region of photographic interest, or by having a single filter containing a mixture of substances whose combined absorption covers the entire spectral region of photographic interest. Also, certain combinations of molecules result in more pronounced effects when one of the molecules absorbs energy and transfers at least part of this energy to another nearby molecule which actually performs the absorption of the light wavelength of interest. The balancing of the separate spectral portions in the desired neutral composite filter can be realized by adjusting the concentration of the metastable substances used in the several filters of a filter system. Alternatively, the relative absorptions of the separate substances in juxtaposed filters can be controlled by changing the thicknesses and concentration of the individual filter substances having the selective absorptions.

For color film, a combined filter with neutral characteristics over the entire visible region of the spectrum is desired. However, for black and white film it would also be of interest to have a filter which displayed a neutral absorption characteristic over the infra-red region of the spectrum or over the ultra-violet region of the spectrum. This could be similarly accomplished by using a composite of filters, or a filter containing a combination of substances which will cooperate in a desired manner.

The automatic operation of a filter system including a dynamic color intensity control and color balancing filters is graphically illustrated in FIG. 4 wherein the axis of the ordinates is the light intensity scale in percent of the effective sunlight, in a particular environment, and the axis of the abscissas is the light wavelength scale in microns. A curve A represents the effective sunlight in a given environment such as a sandy beach. A curve B is the effective reflected light spectrum intensity influence on the human retina with the reflected light coming from a non-lustrous white body (object 20). Since certain color films are designated with a somewhat similar sensitivity, it may be assumed for the present discussion that film 11 has a sensitivity as illustrated by curve B. Thus the maximum light intensity is centered in the yellow region of the spectrum and slopes downward into both the ultra-violet and the infra-red regions. However, the magnitude of the curve B in the particular environment selected is so great that the camera system 10 of the type shown in FIG. 1 would result in the film 11 being overexposed.

In order to prevent such overexposure, a plurality of dynamic filters are placed in front of the film 11 as illustrated in FIG. 1. The dashed curves C and C′ represent the types of absorption which may be expected from a particular metastable substance such as 1.2, 5.6 dibenzanthracene, with the dashed curve C lying in the invisible ultra-violet region of the spectrum and the dashed curve C′ lying in the blue-green region of the visible radiative spectrum. Thus the dashed curve C represents the absorption of invisible light energy, as by the singlet state of the 1.2, 5.6 dibenzanthracene, necessary to change the population of the particular metastable substance to create a desired magnitude of absorption of the visible radiant energy as represented by the dashed curve C′. The dashed curve C′ indicates the desired light intensity control types of absorption obttainable when light rays 24 are intercepted by a light intensity control filter containing a predetermined population of the triplet state of 1.2, 5.6 dibenzanthracene.

On the other hand, the dotted curves D and D′ represent the types of absorption which may be expected from another metastable substance, such as 2, (2′, 4′) dinitrobenzylpyridine, with he dotted curve D lying in the near ultra-violet region of the spectrum and representing the absorption of one isomer necessary to create a desired magnitude of population of another isomer and the dotted curve D′ lying in the yellow-red range of the radiation spectrum and representing the absorption of the another isomer. Since the dashed curve C' and dotted curve D' overlap slightly, their sum is represented by dot-dash curve E.

Thus it becomes apparent that the combination of dashed curve C', dot-dash curve E, and dotted curve D' represents a relatively constant percentage absorption of all light colors whereby the effective reflected light reaching the film 11 will lie along a curve B'. The relative concentration of the metastable substances in the filter system is selected so that the curve B' represents a light intensity in practically any environment which is acceptable to the film 11. Thus a versatile photographic program is possible without resort to any mechanical variation of the camera system.

However, it should be noted that with many of the substances under consideration the dashed curves C and dotted curves D also overlap, indicating that when one substance is placed in front of another a portion of the activating radiation wavelengths will be absorbed by the front filter and thus will not reach the second filter. This problem may be partially overcome by having the second filter effectively thicker than would be necessary if no such prior filtering had occurred.

However, the problem may also be overcome by the filter arrangement shown in FIG. 5 wherein a composite filter 60 is divided laterally into two adjacent regions of metastable substances including the light intensity control regions 61 and 62. The relative sizes of these regions are dependent somewhat on the characteristic of the film 11. It should be noted that the use of a metastable substance 64 in the upper region 61 which controls substantially only blue-green radiation 24a will result in the passage of a percentage of the yellow-red radiation 24b, dependent upon the area of the portion 61; similarly, the inclusion of a metastable substance 65 in the portion 62 which controls the yellow-red radiation 24b of the spectrum will result in the passage of a major portion of the blue-green radiation 24a therethrough whereby the total effectiveness of the filter 60 might be reduced.

This phenomena is prevented by adding constant color balancing filters in back of the metastable filter substances 64 and 65 so that a constant balancing filter portion 67 blocks all yellow-red radiation 24b of the type controlled by the filter portion 62 and a constant color balancing filter portion 68 blocks all blue-green radiation 24a of the type controlled by the filter portion 61.

In this arrangement the composite filter 60 has full control over the magnitude of light energy intensity reaching the film 11 through the lens system 14 of the camera. It is also realized that this more complex composite filter system 60 using four filter portions will reduce, on the order of fifty percent, the total light intensity reaching the lens system. However, in most outdoor pictorial environments where appreciable amounts of near ultraviolet radiation are present, the magnitude of light energy is sufficient and the effective lens aperture of the camera may be made sufficiently large so that such reduction will not interfere with the obtaining of a properly exposed negative.

Furthermore, using the composite filter 60 does not restrict the use of metastable substance or mixtures to those which obtain their energization from invisible radiation. As a result, the metastable substance 64 can be selected to receive energy of the red wavelengths to provide control of the blue-green and the metastable substance 65 can be selected to receive energy of the green wavelengths to provide control of the yellow-red region of the spectrum. Moreover, more than two types of metastable substances may be placed adjacent to each other to obtain a most desired "gray" dynamic filter.

In any of the foregoing arrangements it is desirable to position the variable light control filter in front of the camera lens system 14 or within the lens system 14a or 14b rather than behind any lens system. The reason for this is that if the control filter were disposed any appreciable distance behind the lens system, the intensity difference between the light and dark portions of the imaged scene, even though admittedly out of focus when spaced from the plane of the film, might be expected to cause localized density changes in the control filter and thus some distortion of the image 18. Since the light intensity received by the variable light control filter 30 is uniform in a location in front of the lens system 14, the problem may be avoided easily. While I have shown and described above particular embodiments of this invention, other modifications may occur to those skilled in the art. For instance, if one desires to change substantially the lens system of a camera system to include a prismatic monocular or binocular arrangement, reflective coatings of metastable substances can be used to intercept and control the light rays, with the reflective characteristic of the substance controlling the relative filtering rather than the transmissive characteristic as defined herein. Moreover, it should be recognized that certain of the compounds useable in the practice of my invention may not be clearly definable within either the class of tautomeric compounds or of those having metastable triplet states. It will also be appreciated that many of the metastable substances set forth above will respond to changes in light intensity within a few milliseconds. This speed of response is more rapid than is normal to the human iris or popular lightmeters so that the programming of a camera equipped with my invention may include scenes of explosive fires or other very bright and unpredictable light phenomena. It is intended, therefore, by the appended claims to cover all such modifications as come within the true spirit and scope of the present invention.

The embodiments of the invention in which an exclusive property or privilege is claimed are defined as follows:

1. In combination with a photographic camera having a lens and normally accommodating a photographic film, means supported by the camera and being free of mechanically moving parts for automatically regulating the intensity of light impinging on the photographic film, said means comprising a photochromic means that is progressively responsive to the intensity of certain wavelengths of light received by the camera to automatically regulate the intensity of certain other wavelengths of light lying within the spectral sensitivity range of the film, that are applied to the film, and means carried by the camera for absorbing light energy transmitted through said photochromic means which is of wavelengths different from said certain other wavelengths and lying within the spectral sensitivity range of the film.

2. In combination with a photographic camera and film system useable in various light intensity environments, a filtering arrangement comprising: a first metastable filter means secured to the camera and arranged to intercept light rays passing to the film from an object of pictorial interest, said first metastable means being rapidly and reversibly modifiable in response to radiant energy to provide rapid convertibility from one light energy transmissivity to another in response to changes of light intensity passing thereto from the object so that greater intensities of light will reduce the transmissivity of certain light energy wavelengths to the film; and a second metastable filter means secured to the camera and arranged to intercept light rays transmitted through said first metastable filter means, said second metastable filter means being rapidly and reversibly convertible from one light energy transmissivity to another in response to changes of light intensity of wavelengths other than said certain light energy wavelengths whereby prior interception by said first metastable filter means will not unduly limit metastable modification of said second metastable filter means so that greater intensities of light from the object will reduce the transmissivity of the light energy wavelengths to the film which are complementary to said certain light energy wavelengths.

3. In combination with a photographic camera and film system useable in various light intensity environments, a filtering arrangement comprising: a first metastable filter means secured to the camera and arranged to intercept a first portion only of the light rays passing to the film from an object of pictorial interest, said first metastable filter means being rapidly and reversibly modifiable in response to radiant energy intercepted thereby to provide rapid convertibility from one light energy transmissivity to another in response to changes of light intensity passing thereto from the object so that greater intensities of light will reduce the transmissivity of certain light energy wavelengths; a second metastable filter means secured to the camera adjacent to said first metastable filter means and out of the light path of rays intercepted thereby so as to intercept a second portion only of the light rays passing to the film from the object, said second metastable filter means being rapidly and reversibly modifiable in response to radiant energy intercepted thereby to provide rapid convertibility from one light energy transmissivity to another in response to changes of light intensity passing thereto from the object so that greater intensities of light will reduce the transmissivity of light energy wavelengths which are complementary to said certain light energy wavelengths; and color balancing filter means for selectively absorbing said other light energy wavelengths that are transmitted through said first metastable filter means and for selectively absorbing said certain light energy wavelengths that are transmitted through said second metastable filter means.

4. In combination with a photographic camera and film system useable in various light intensity environments, a filtering arrangement comprising: a first metastable filter means secured to the camera and arranged to intercept a first portion only of the light energy passing to the film from an object of pictorial interest, said first metastable filter means being rapidly and reversibly modifiable in response to radiant energy intercepted thereby to provide rapid convertibility from one light energy transmissivity to another in response to changes of light intensity passing thereto from the object so that greater intensities of light will reduce the transmissivity of certain light energy wavelengths; a second metastable filter means secured to the camera adjacent to said first metastable filter means and out of the light path of rays intercepted thereby so as to intercept a second portion only of the light energy passing to the film from the object, said second metastable filter means being rapidly and reversibly modifiable in response to radiant energy intercepted thereby to provide rapid convertibility from one light energy transmissivity to another in response to changes of light intensity passing thereto from the object so that greater intensities of light will reduce the transmissivity of other light energy wavelengths which are complementary to said certain light energy wavelengths; a first color balancing filter means positioned to intercept all light energy transmitted through said first metastable filter means and whose absorption characteristic is such as to reduce selectively and substantially said other light energy wavelengths whereby any change of transmissivity of said second metastable filter means will have a correlative effect on the energization of the film; and a second color balancing filter means positioned to intercept all light energy transmitted through said second metastable filter means and whose absorption characteristic is such as to reduce selectively and substantially said certain light energy wavelengths whereby any change of transmissivity of said first metastable filter means will have a correlative effect on the energization of the film.

References Cited by the Examiner

UNITED STATES PATENTS

| | | | |
|---|---|---|---|
| 2,952,195 | 9/1960 | Babcock et al. | 88—113 X |
| 2,953,970 | 9/1960 | Maynard | 88—113 |
| 2,998,762 | 9/1961 | Goodard | 88—113 X |
| 2,999,443 | 9/1961 | Miyarchi | 88—113 X |
| 3,085,469 | 4/1963 | Carlson | 88—106 |
| 3,105,761 | 10/1963 | Foris | 88—106 |
| 3,174,537 | 3/1965 | Meyer | 88—106 |

JOHN M. HORAN, *Primary Examiner.*

C. B. PRICE, *Assistant Examiner.*